(12) United States Patent
Present et al.

(10) Patent No.: US 12,409,559 B1
(45) Date of Patent: Sep. 9, 2025

(54) HIGH-CAPACITY TOTES COLLAPSER

(71) Applicant: Amazon Technologies, Inc., Seattle, WA (US)

(72) Inventors: Hunter Present, Seattle, WA (US); Sean Peter Roberts, Kent, WA (US); Colin Ross Kreiger, Lake Stevens, WA (US)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 18/541,266

(22) Filed: Dec. 15, 2023

(51) Int. Cl.
*B25J 11/00* (2006.01)
*B25J 9/16* (2006.01)

(52) U.S. Cl.
CPC .......... *B25J 11/005* (2013.01); *B25J 9/1679* (2013.01)

(58) Field of Classification Search
CPC ................ B31B 2120/302; B31B 2220/04
USPC .................................................. 493/309, 311
See application file for complete search history.

(56) References Cited

U.S. PATENT DOCUMENTS

| | | | | |
|---|---|---|---|---|
| 2,896,382 | A * | 7/1959 | Back ....................... | B65B 11/10 53/381.1 |
| 3,791,268 | A * | 2/1974 | Kollmar .................. | B31B 50/26 493/311 |
| 7,841,975 | B2 * | 11/2010 | Korechika ............ | B60R 21/235 493/308 |
| 12,077,335 | B2 * | 9/2024 | Kim ........................ | B31B 50/52 |
| 2008/0312054 | A1 * | 12/2008 | Boland .................. | B65D 15/22 206/508 |

* cited by examiner

*Primary Examiner* — Praachi M Pathak
(74) *Attorney, Agent, or Firm* — Kilpatrick Townsend & Stockton LLP

(57) ABSTRACT

A tote collapser can be used for unlatching and collapsing walls of a shippable tote. The collapser includes a mounting frame, and a set of collapser brackets. The mounting frame can include a first frame member and a second frame member movable relative to each other. The set of collapser brackets can include a first and a second collapser brackets attached to the first frame member, and a third and a fourth collapser brackets attached to the second frame member. Each collapser bracket can include an indexer shaped to align the tote in a specified orientation, a retainer extending perpendicularly from the indexer and configured to engage with top side of the sidewalls, a bumper shaped to engage with a latch on a sidewall of the tote, and a receiving space between the indexer and the bumper to receive a thickness portion of the sidewall of the tote.

20 Claims, 10 Drawing Sheets

HIGH-CAPACITY TOTES COLLAPSER

BACKGROUND

Inventory systems, such as those in warehouses, supply chain distribution centers, airport luggage systems, and custom-order manufacturing facilities, face significant challenges in storing inventory items. Typically, high-capacity totes are used to store and transport items through these inventory systems. Once the items in the totes are stored at an inventory storage location, moving or shipping empty totes to a secondary location may be prohibitively expensive, limiting the ability of the location to accommodate additional items. The user of high-capacity totes, such as those that have large volumes and straight sidewalls, may be capable of accommodating additional items. However, because the stacking density of these high-capacity totes is lower, use of them may result in inefficient use of space within the inventory systems.

BRIEF DESCRIPTION OF THE DRAWINGS

Various embodiments in accordance with the present disclosure will be described with reference to the drawings, in which.

DETAILED DESCRIPTION

Figure 1:
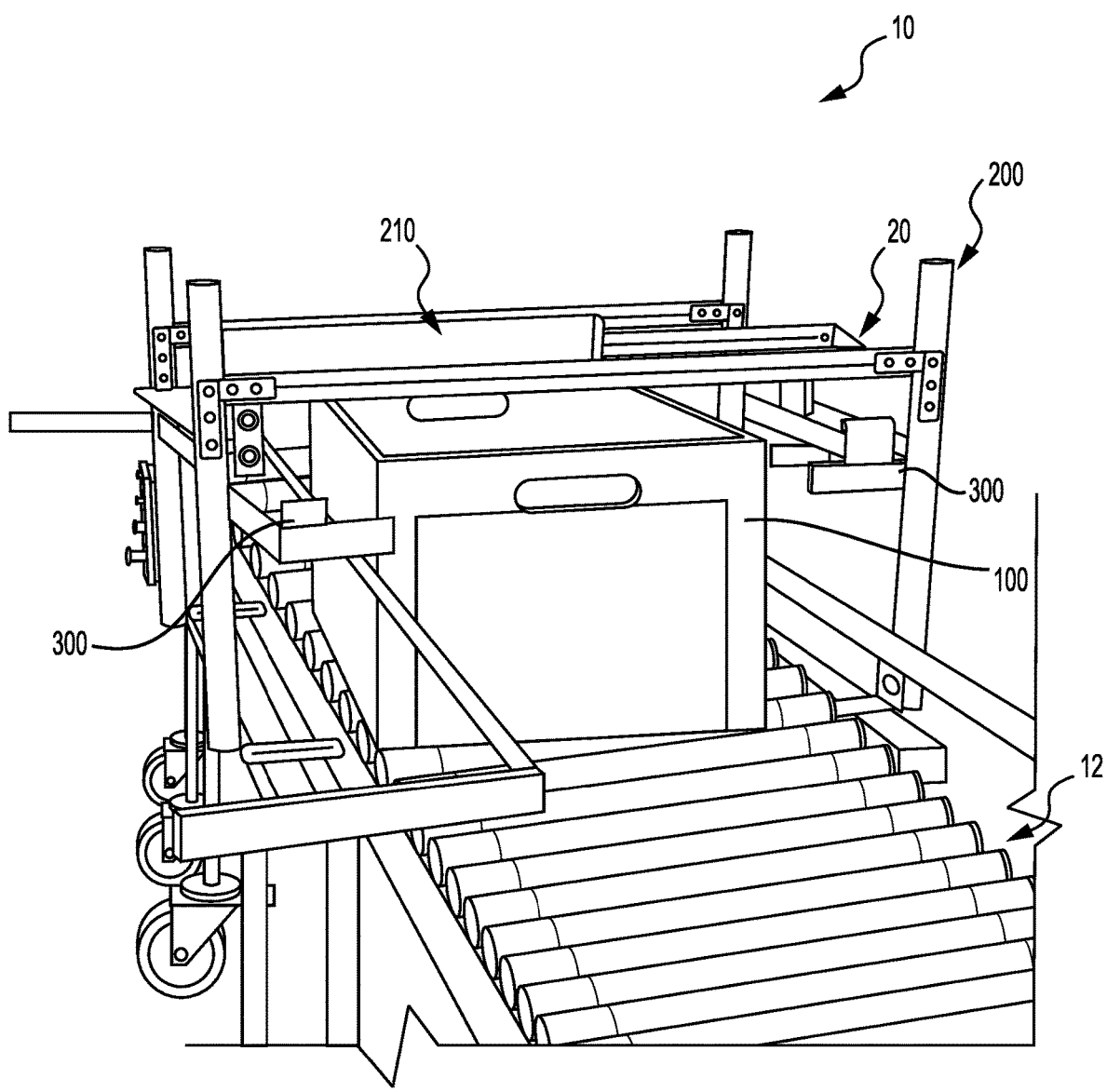
FIG. 1 illustrates an example station of an inventory system employing a tote collapser with an automatic linear actuator, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein are directed to features that may be utilized for high-capacity totes of inventory systems. The present disclosure provides totes and a tote collapser to advantageously maximize a cubic volume of storage capacity of a tote and to maximize a density of stacked totes. The sidewalls of the totes herein can be collapsed to facilitate nesting of totes. The tote collapser herein also facilitates efficient collapsing of high-capacity totes leading to increased efficiencies in terms of time, and space, while making tote collapsing an ergonomically friendly operation.

An example tote collapser may include features for unlatching and collapsing sidewalls of a collapsible tote such as a shippable tote. In a collapsible tote, one sidewall can be latched to another and can be foldable or collapsible relative to a bottom wall. The sidewalls can be hingedly coupled to the bottom wall. With the tote collapser, sidewalls of an empty tote can be collapsed, with minimal human intervention or effort, to a compact size for transporting.

In various embodiments, the tote collapser can include a mounting frame and a set of collapser brackets coupled to frame members of the mounting frame. In one example, the frame members can be moved via a linear actuator. The linear actuator can be moved automatically or manually operated. In another example, the tote collapser can be mounted to a table and used by an operator to manually place and collapse the tote without the linear actuator.

In various embodiments, each collapser bracket of the tote collapser can include an indexer shaped to align the tote in a specified orientation, a bumper shaped to engage with a latch on a sidewall of the tote, and a receiving space between the indexer and the bumper to receive a portion of the sidewall of the tote. Optionally, the collapser bracket can include a retainer extending perpendicularly from the indexer and configured to engage with top side of the sidewalls for limiting upward vertical displacement of the tote sidewall during use.

In operation, the collapser brackets can be moved towards respective latches of the sidewalls of the tote. The indexer can align sides of the tote parallel to a frame member. The bumper can push the latch on the sidewalls of the tote to a released state and further may push the released sidewalls toward a collapsed state. During an initial move, the contoured surface portion of the bumper engages and push a latch as a collapser bracket is advanced relative to the tote. Upon moving further, the flat surface of the bumper can push a face of the sidewall and collapse it over a bottom wall. This way, the tote can be collapsed or folded with the sidewalls folded over each other. Several folded totes can be stacked on top of each other to enable transportation.

Referring now to the drawings, in which similar identifiers refer to similar elements, FIG. 1 illustrates an example tote collapser station 10 of a fulfillment center according to various embodiments. In the illustrated embodiment of FIG. 1, the station 10 can include a conveyor 12, and a tote collapser 20. The tote collapser 20 may be located at an end or portion of the conveyor 12, in line with the conveyor 12, and/or otherwise aligned to be positioned for acting on items supplied by the conveyor 12. The conveyor 12 can receive a tote 100 at one portion and move the tote 100 to the tote collapser 20 at another portion. In the illustrated embodiment, the tote collapser 20 can be configured to automatically collapse sidewalls of the tote 100. For example, the tote collapser 20 can include a mounting frame 200, an automatic linear actuator 210, and a set of collapser brackets 300. The automatic linear actuator 210 can be configured to move the set of collapser brackets 300 relative to the tote 100. For example, the automatic linear actuator 210 can be a piston cylinder arrangement coupled to frame members of the mounting frame 200. Movement of the piston within the cylinder can be automatically controlled to control movement of the collapser brackets 300. The automatic linear actuator 210 can be controlled remotely, e.g., using a controller or other computer systems of the fulfillment center. While a linear actuator 210 is shown and described with respect to FIG. 1, the present disclosure is not limited to use of a linear actuator. Any other suitable actuator or other mechanism capable of performing the function described herein may be employed to move the frame members. For example, other suitable actuators may include a lead screw, a solenoid, a motor operated actuator, or other mechanical or electromechanical actuators.

Figure 2:
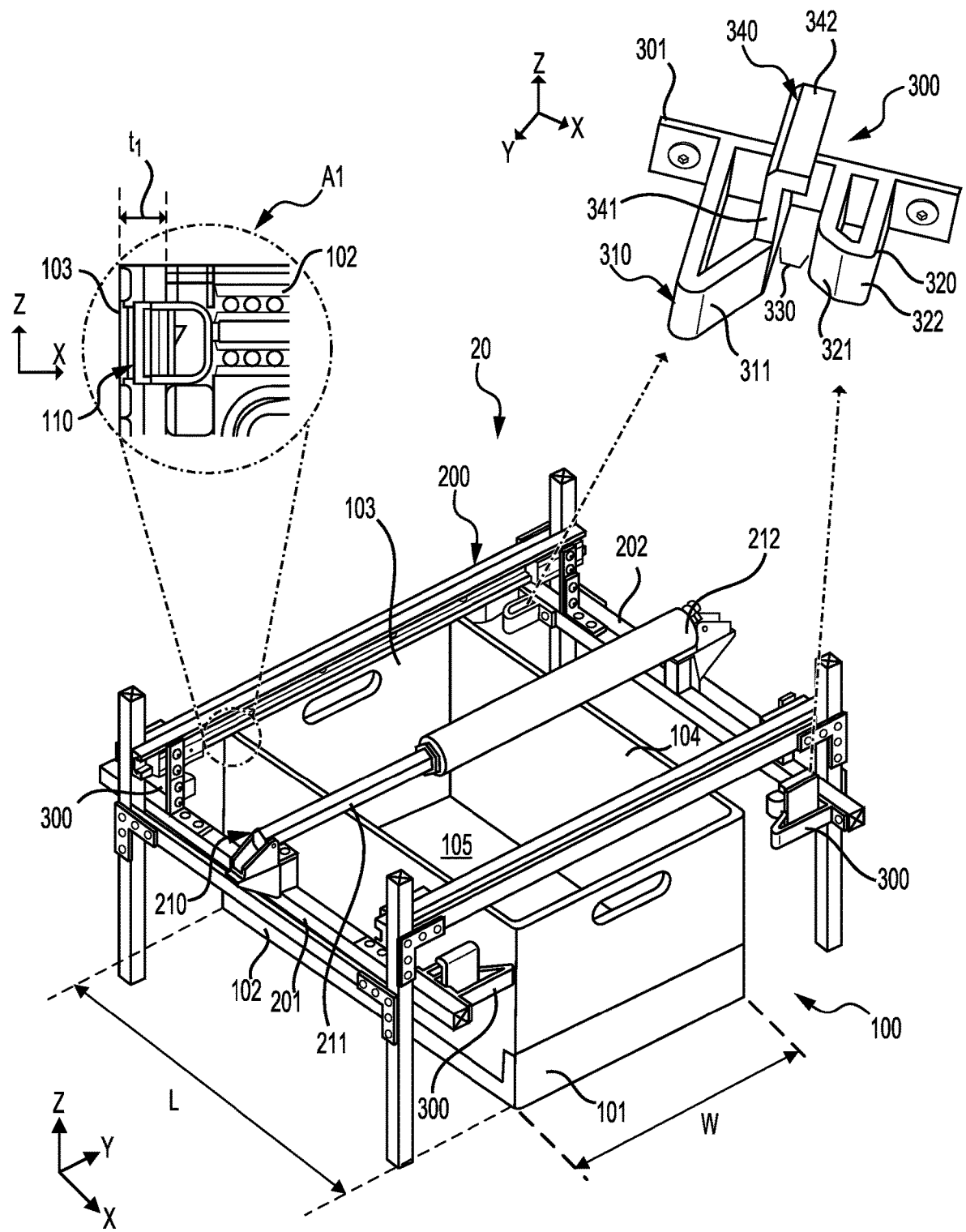
FIG. 2 illustrates an example tote collapser with a tote in un-collapsed state, according to various embodiments.
Figure 3:
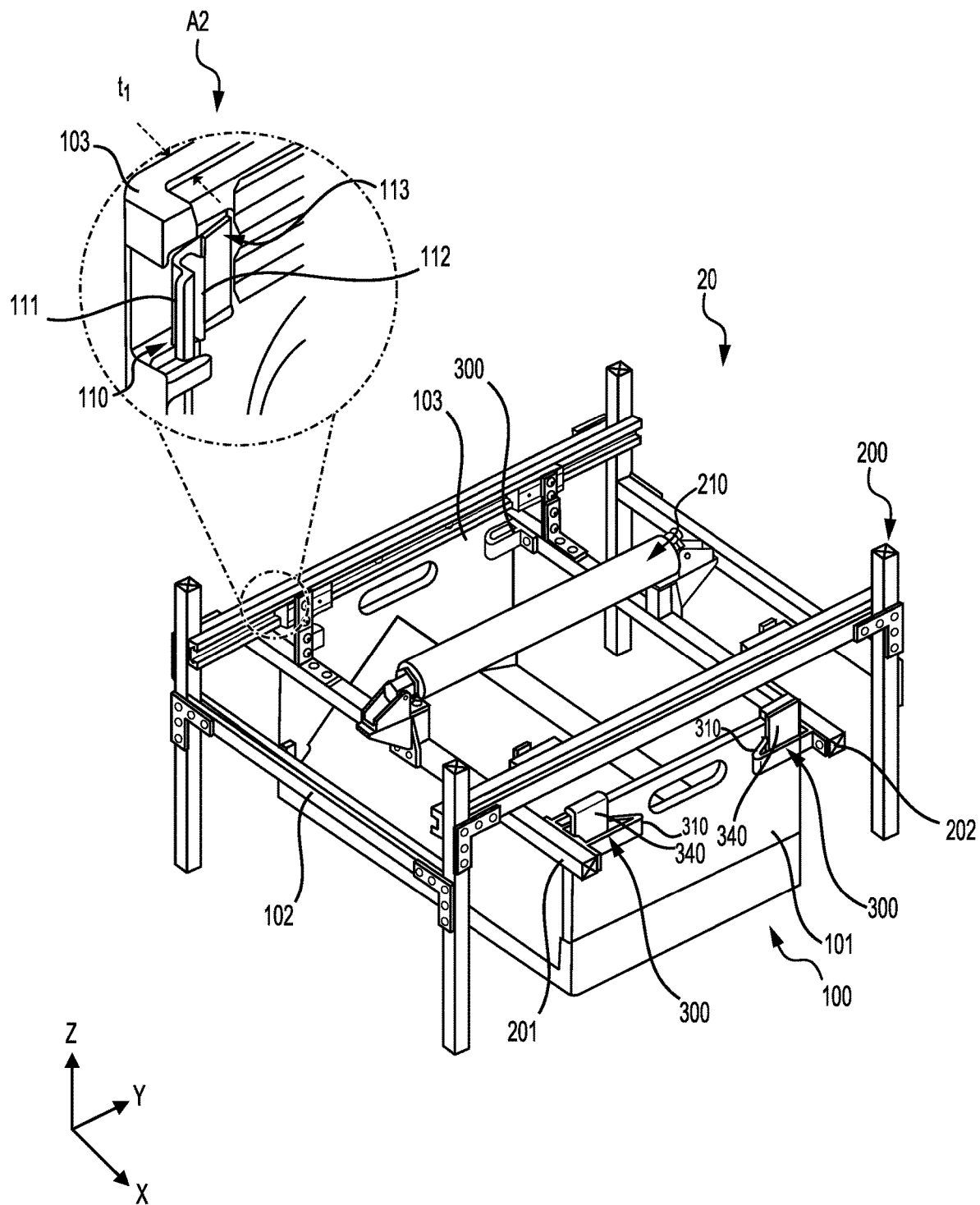
FIG. 3 illustrates the tote collapser of FIG. 2 with the tote in a collapsed state, according to various embodiments.

FIGS. 2 and 3 illustrate an example of the tote collapser 20 and a tote 100 in un-collapsed state and in a collapsed state, respectively. In many embodiments, the tote collapser 20 can include a mounting frame 200 and a set of collapser brackets 300. The tote 100 can be received at the mounting frame 200 and aligned with the set of collapser brackets 300. As shown in FIG. 2, the tote 100 is received in an un-collapsed state, where all sidewalls (e.g., 101, 102, 103, 104) of the tote 100 are in upright state and coupled to each other. As shown in FIG. 3, the set of collapser brackets 300 are moved towards an opposing couple of sidewalls (e.g., 102 and 104) of the tote 100 to unlatch and collapse the sidewalls (e.g., 101, 102, 103, 104). This way, the tote 100 can be in the collapsed state. In the collapsed state, the sidewalls (e.g., 101, 102, 103, 104) of the tote 100 can fold on top of each other or lie in a plane to form a compact platform. Several such collapsed totes can be stacked on top of each other thereby saving space during shipping/transporting of empty totes.

In the illustrated embodiment, the mounting frame 200 can include a first frame member 201 and a second frame member 202 movable relative to each other. For example, the linear actuator 210 can be mounted on top of the mounting frame 200 and coupled to the frame members 201 and 202 to move them towards or away from each other. The linear actuator 210 may be an automatically operated piston cylinder, where a piston 211 can be attached to the first frame member 201 and an end of a cylinder 212 can be attached to the second frame member 202. When the piston 211 moves in and out of the cylinder 212, the frame members 201, 202 can move towards or away from each other. The linear actuator 210 can be located approximately at the center of the frame members 201 and 202. This allows the frame members 201 and 202 to move relatively parallel to each other and be parallelly aligned a length of the sidewall (e.g., a front sidewall and a back sidewall) of the tote 100. Such alignment can facilitate simultaneous engagement of each of the set of collapser brackets 300 with the tote 100. In some cases, the sidewalls of the tote 100 may flex in response to a force. Hence, proper alignment of the collapser brackets 300 with the tote 100 can prevent any misorientation of the tote 100 during the collapsing process. The present disclosure provides several features that can be used for proper alignment of the tote 100 with respect to the collapser brackets 300.

In the illustrated embodiment, the set of collapser brackets 300 can include four collapser brackets 300 corresponding to corners of the tote 100. For example, a first and a second collapser brackets 300 can be coupled to the first frame member 201 and spaced from each other. Similarly, a third and the fourth collapser brackets 300 can be coupled to the second frame member 202 and spaced from each other. A lateral distance (e.g., along x-direction) between the collapser brackets 300 on the first frame member 201 and those on the second frame member 202 can each be the same. For example, the lateral distance can correspond to a distance L1 between latches on the sidewalls of the tote 100 (e.g., see distance L1 between latches 110 in FIG. 4).

In the illustrated embodiment, e.g., in FIG. 2, the collapser bracket 300 can include a base 301, an indexer 310, a bumper 320, a receiving space 330 and optionally a retainer 340. The base 301 can be configured to be attached to a frame member (e.g., 201, 202) or other mounting surfaces. For example, the base 301 can include holes to receive a fastener. The indexer 310 and the bumper 320 can extend perpendicularly (e.g., along y-axis) to the base 301. The indexer 310 can be longer in length than the bumper 320. This may allow the indexer 310 to engage with the tote sidewalls and align the sidewalls with the frame members 201, 202 prior to engaging the bumper 320. The receiving space 330 can be a space between the indexer 310 and the bumper 320. The receiving space 330 can be sized to receive a thickness portion (e.g., t1 of sidewall 103 shown FIGS. 5 and 6) of the sidewall of the tote.

The indexer 310 can be or include an indexer projection extending or projecting from the base 301. In many embodiments, the indexer 310 can include a shaped portion 311 (e.g., an inclined portion) to align the tote 100 in a specified orientation. For example, the indexer 310 can facilitate left-right centering of the tote 100 with respect to the mounting frame. In the illustrated embodiment, the indexer 310 can include an inclined surface 311 that is angled away from the receiving space 330 and the bumper 320. The inclined surface 311 can extend relatively beyond a length of the bumper 320. For example, the indexer 310 can have an indexer length (e.g., see L2 in FIG. 5) greater than a bumper length (e.g., see L3 in FIG. 5) of the bumper 320. The inclined surface 311 extends distally from a base portion (e.g., see L4 in FIG. 5) attached to the base 301.

The inclined surface 311 can allow a sidewall of the tote to be aligned within the receiving space 330. If the tote 100 is not properly aligned or oriented with respect to the set of collapser brackets 300, the sidewalls of the tote 100 can slide along the inclined surface 311 and reorient the tote 100. For example, if the tote 100 is not centered with respect to the mounting frame, or slightly angularly misoriented, the inclined surface 311 can center and/or reorient the tote 100 so that the face of the sidewalls 102 and 104 (e.g., FIG. 2) are substantially parallel to the frame members 201, 202. This way, the indexer 310 can properly align the tote 100 before the bumper 320 is engaged with the tote 100 to unlatch the sidewalls.

Additionally or alternatively, the retainer 340 can be or include a retainer projection extending perpendicularly (e.g., along z-direction) from the indexer 310 and configured to engage with top side of the sidewalls (e.g., see FIG. 3). As may be best seen in FIG. 2, the retainer 340 can be an L-shaped element including a leg 341 and a flange 342. The leg 341 can extend perpendicularly (e.g., along z-direction) from the indexer 310, and the flange 342 can be perpendicular (e.g., along x-direction) to the leg 341. In the illustrated embodiment, the retainer 340 may be disposed adjacent to the receiving space 330 such that the flange 342 extends over or above the receiving space 330. When a portion of the sidewall (e.g., 101, 103) is received within the receiving space 330, the flange 342 can engage with the topside of the sidewall and prevent the tote from misaligning or misorienting during a tote collapsing process.

In many embodiments, the bumper 320 can be or include a bumper projection shaped to engage with a latch (e.g., 110) on a sidewall of the tote (e.g., 100). The bumper 320 can have a contoured surface 321 and a flat surface 322. The contoured surface 321 can be configured to progressively push the latch (e.g., 110) of the tote (e.g., 100) and unlatch the sidewall (e.g., in a camming action as the bumper 320 is pressed inward against the latch (e.g., 110) of the sidewall). The contoured surface 321 can be a curved surface contoured to push the latch 110 (e.g., push a tab 111 (e.g., FIG. 3) of the latch 110). As another example, the contoured surface 321 can be an inclined surface, curved, and/or other suitable shapes. The contoured surface 321 may bound a portion of the receiving space 330 and/or curve away from the receiving space 330. The flat surface 322 of the bumper 320 can extend (e.g., distally from the base 301) from the contoured surface 321. The flat surface 322 can be configured to engage with a face of the sidewall (e.g., a front face of the sidewall 102) and collapse the sidewall (e.g., 102) of the tote 100 (e.g., when the latch 110 has been released by the bumper 320).

Figure 4:
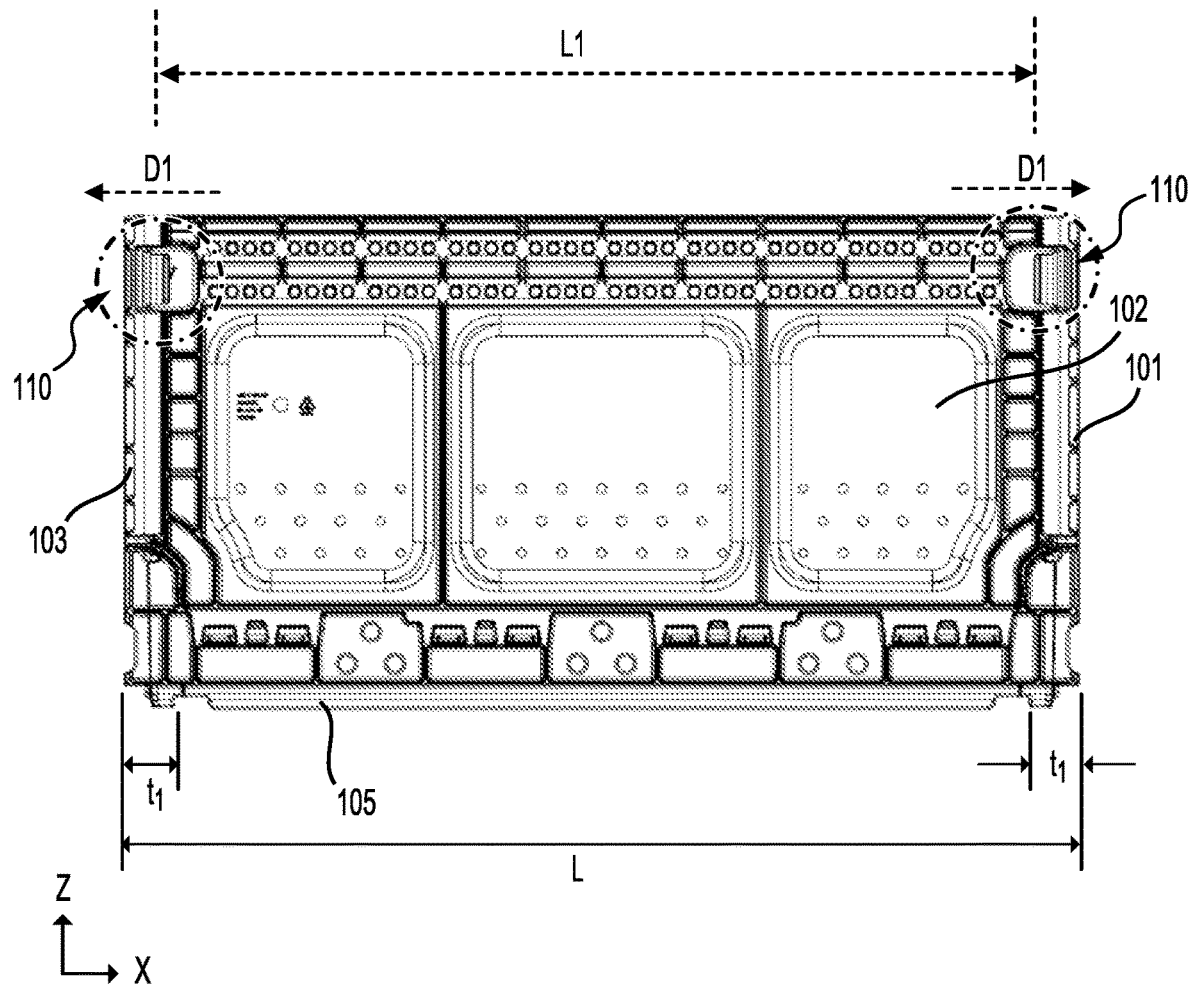
FIG. 4 illustrates an example tote, according to various embodiments.

Referring to FIGS. 2-4, the tote 100 can include four sidewalls (e.g., a right sidewall 101, a front sidewall 102, a left sidewall 103, and a rear sidewall 104), a bottom wall (e.g., 105) and an open top to receive or remove items. The tote 100 can have a length L (see FIG. 4), and width W (see FIG. 2). One sidewall can be coupled to another sidewall using a latch 110 (e.g., see enlarged portions A1 and A2 in FIGS. 2 and 3). The latch 110 can be located on one of the sidewalls. In the illustrated embodiments, two latches 110 can be located on the left sidewall 103 and two latches 110 can be located on the right sidewall 101. For example, as shown in an enlarged left portion A1 of the tote 100 in FIG. 2, the front sidewall 102 is coupled to the left sidewall 103 via a latch 110. Similarly, the front sidewall 102 can be coupled to the right sidewall 101 via another latch 110, the back sidewall 104 can be coupled to the right sidewall 101 via yet another latch 110, and the back sidewall 104 can be coupled to the left sidewall 103 via yet another latch 110. Referring to FIG. 4, the front sidewall 102 is coupled with the left sidewall 103 and the right sidewall 101 via respective latches 110.

Referring to an enlarged left sidewall portion A2 in FIG. 3, the latch 110 can include a tab 111, a lip 112, and a pivot arm 113. The latch 110 can be formed as a cantilever on a sidewall, can be spring loaded, or can have other lock/latch configurations. For example, as shown in the enlarged portion A2, the latch 110 is cantilevered such that when a force is applied at the tab 111, the latch 110 moves away (e.g., in direction D1 shown in FIG. 4) about the pivot arm 113. In many embodiments, such force is applied by the contoured surface (e.g., 321) of the bumper (e.g., 320) of the collapser bracket (e.g., 300). The lip 112 (e.g., on the sidewall 103) can engage with an inside surface of an adjacent sidewall (e.g., 102) to lock the sidewalls together. When the tab 111 is moved sideways (e.g., along direction D1), the lip 112 can be disengaged from the adjacent sidewall (e.g., 102) so that the sidewalls can be collapsed or folded over one another. It can be understood that the present disclosure is not limited to a particular latch, and other appropriate latches (e.g., having a plate-like form, a cylindrical, or other shapes) may be used to latch the sidewalls of the tote 100.

In operation, when the linear actuator 210 (e.g., in FIG. 1) is actuated the frame members 201, 202 moves towards each other to cause the set of collapser brackets 300 to undergo motion toward the tote 100. In response to the motion, the indexer 310 aligns the tote relative to the mounting frame 200 and guides the thickness portion (e.g., t1) of the sidewall (e.g., 103) of the tote 100 toward the receiving space. Also, in response to the motion, the bumper 320 engages with the latch 110 and unlatches the latch 110 on the sidewall (e.g., 103) of the tote 100 to facilitate collapse of the sidewalls of the tote 100. The retainer 340 keeps the sidewall from moving upward.

Figure 5:
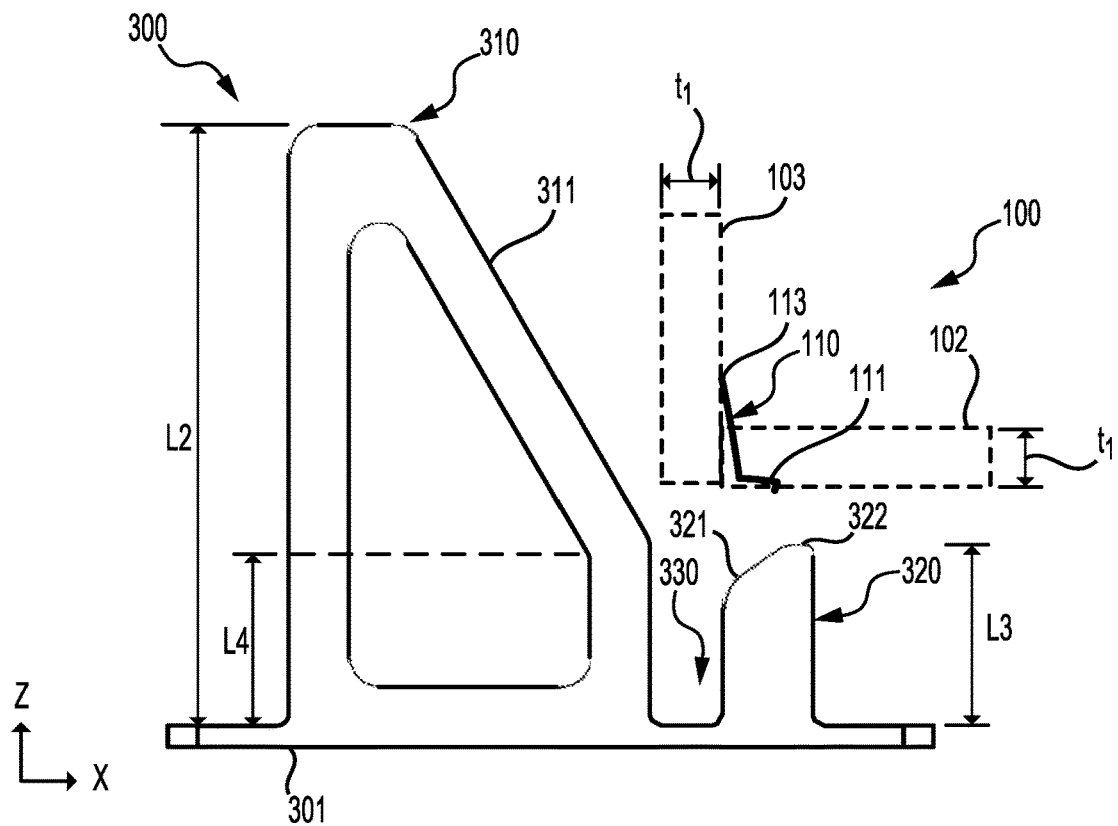
FIG. 5 illustrates an example tote collapser bracket of FIG. 2 aligned with a tote in an un-collapsed state, according to various embodiments.
Figure 6:
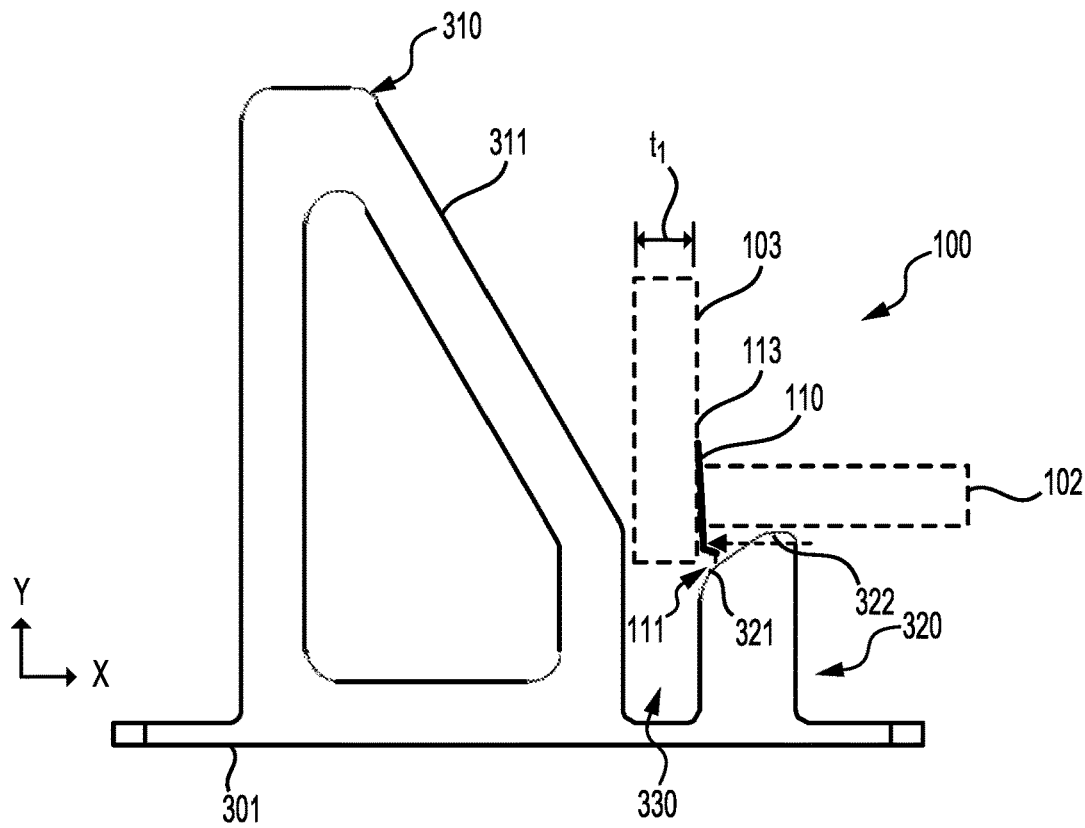
FIG. 6 illustrates the tote collapser bracket of FIG. 2 engaged with the tote in an un-collapsed state, according to some embodiments.

FIGS. 5 and 6 illustrate collapsing operation of the tote using the collapser bracket 300. In the illustrated embodiment, the retainer (e.g., 340) is omitted to better illustrate the indexing and the unlatching process achieved by the collapser bracket 300. Also, portions of only two sidewalls 102 and 103 are shown for illustration purposes to explain the collapsing operation, without limiting the scope of the disclosure. Referring to FIGS. 2 and 5, the tote 100 is appropriately positioned via the inclined surface 311 of the indexer 310. For example, the tote 100 is positioned such that a thickness portion t1 of the left sidewall 103 of the tote 100 is in front of the receiving space 330, and the adjacent sidewall e.g., the front sidewall 102 faces the bumper 320. The tote 100 may travel along the inclined surface 311 of the indexer 310 to reach a suitably aligned position, for example. The latch 110 on the left sidewall 103 is in latched position so that the sidewalls 102 and 103 are locked in place. For example, the tab 111 of the latch 110 is in an extended state. In order to unlatch the latch 110, the collapser bracket 300 is moved closer toward the tote 100 to engage the bumper 320 with the tab 111 of the latch 110.

Referring to FIGS. 3 and 6, as the collapser bracket 300 moves relative to the tote 100, the contoured surface 321 of the bumper 320 engages with the tab 111 of the latch 110. As the contoured surface 321 contacts the tab 111, the contoured surface 321 starts pushing the tab 111 towards the left sidewall 103 and unlatches the front sidewall 102 from the left sidewall 103. Upon moving further, the flat surface 322 of the bumper 320 pushes the unlatched front sidewall 102, causing the now-released front sidewall 102 to collapse (see FIG. 3) over the bottom wall 105. The left sidewall 103 can be retained within the receiving space 330 in an upright position. Similarly, as shown in FIG. 3, the back sidewall 104 is collapsed over the bottom wall 105. Additionally, the remaining sidewalls 101 and 103 can be collapsed over folded sidewalls 102 and 104, thereby flattening the tote 100. In some embodiments, the sidewalls 101-104 can be hingedly coupled to the bottom wall 105. This way, the sidewalls 101-104 can be folded over the bottom wall 105 when the latches 110 are unlatched by the respective collapser brackets 300. One or more flattened totes 100 can be stacked on top of each other to save space and easily transport several totes 100.

Figure 10:
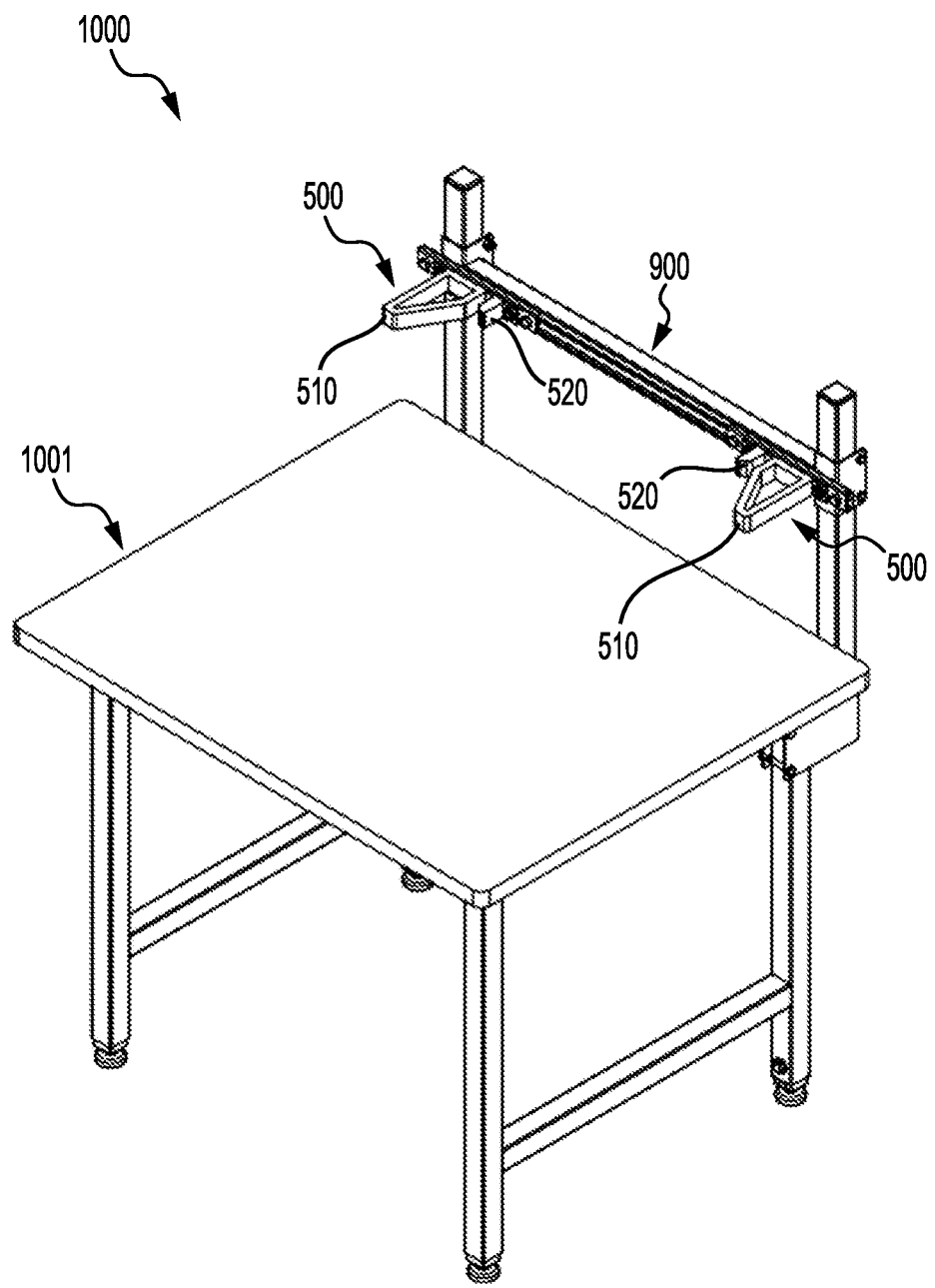
FIG. 10 illustrates a manually operated tote collapser system with the frame member of FIG. 9.
Figure 11:
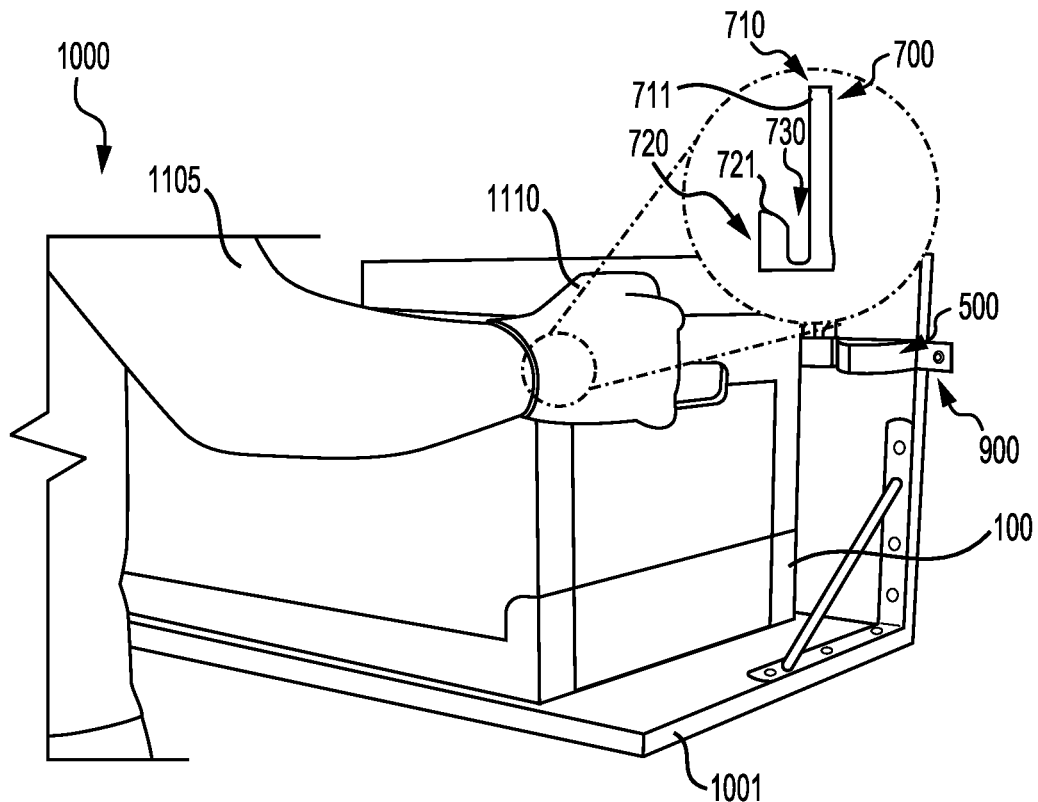
FIG. 11 illustrates a tote collapsing operation using the manually operated tote collapser system of FIG. 10.
Figure 13:
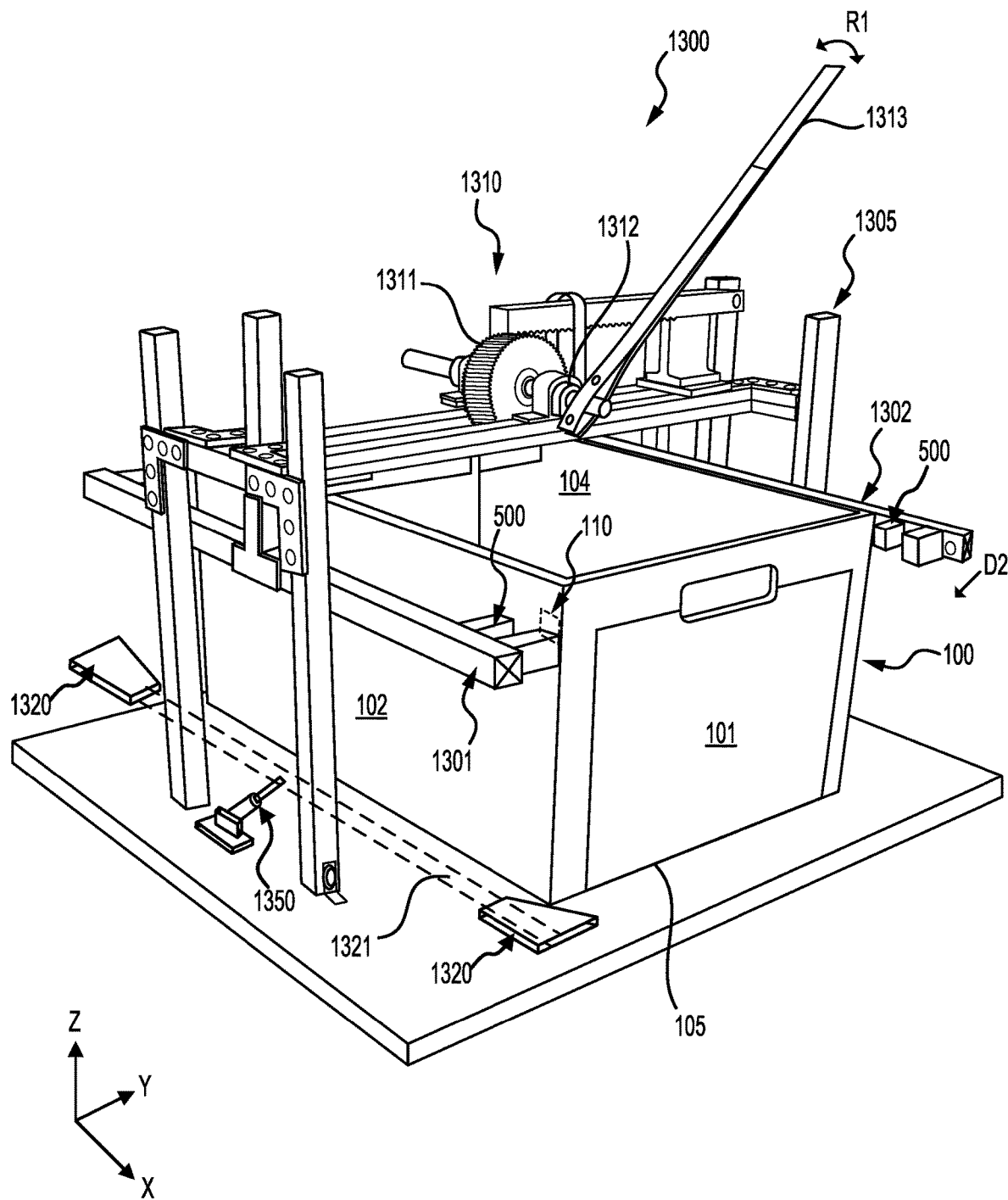
FIG. 13 illustrates a tote collapser with a manually operated linear actuator, according to some embodiments.

The present disclosure is not limited to the collapser bracket 300 or the mounting frame 200 configuration. Other collapser bracket configuration and mounting methods are possible. For example, FIGS. 7, 8 and 11 illustrate other examples of the collapser brackets and FIGS. 9, 10 and 13 illustrate other examples of mounting the collapser brackets.

Figure 7:
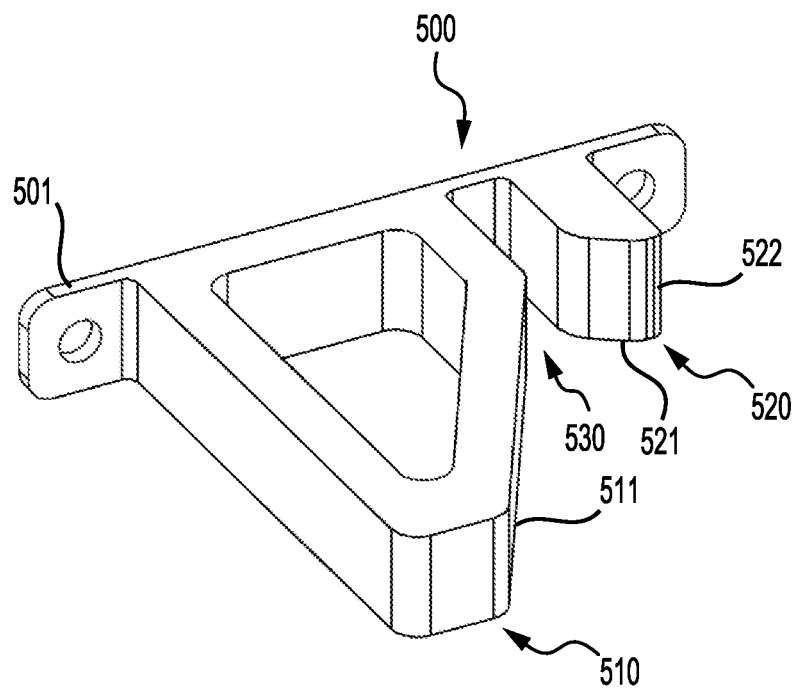
FIG. 7 illustrates a perspective view of an example tote collapser bracket without a retainer.

FIG. 7 illustrates a perspective view of an example tote collapser bracket 500 without a retainer. The collapser bracket 500 is substantially similar to the collapser bracket 300 in structure and function, except for the retainer (e.g., 340). For example, the collapser bracket 500 can include a base 501, an indexer 510, a bumper 520 and a receiving space 530. The indexer 510 can include an inclined surface 511. The bumper 520 can include a contoured surface 521 and a flat surface 522. The collapser bracket 500 can be an integrally formed solid piece. The collapser bracket 500 can be made of plastic or metal. The collapser bracket 500 can be manufactured using an additive manufacturing process (e.g., 3D printer). In some embodiments, the bumper 520 may be solid, while the bumper 320 may be hollow. Although, both the indexer 310 and 510 are shown as hollow, they could be solid.

Figure 8:
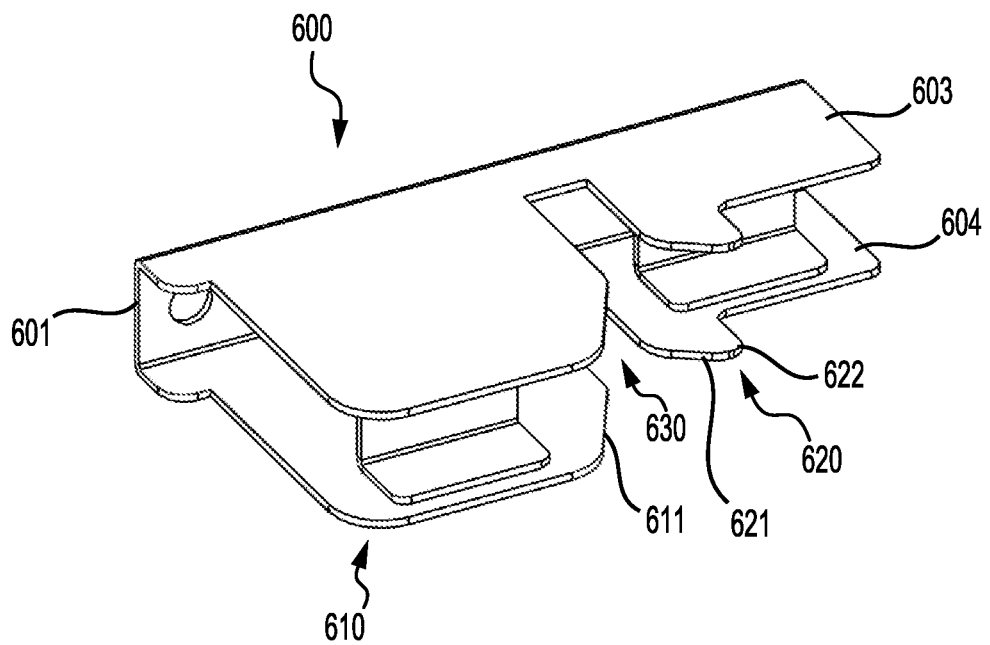
FIG. 8 illustrates a perspective view of another example of a tote collapser bracket.

FIG. 8 illustrates a perspective view of another example of a tote collapser bracket 600. The collapser bracket 600 can be substantially similar to the collapser bracket 300 in structure and function, except for the retainer (e.g., 340). For example, the collapser bracket 600 can include an indexer 610, a bumper 620 and a receiving space 630. The indexer 610 can include an inclined surface 611. The bumper 620 can include a contoured surface 621 and a flat surface 622. The collapser bracket 600 can be made of two thin plates 603 and 604 parallel to each other. The indexer 610 and the bumper 620 may be stamped out of or machined from a metal plate. The space between the plates 603 and 604 maybe hollow. In the illustrated embodiment, the space between the plates 603 and 604 can include a structural support column so that the plates do not collapse onto each other.

Figure 9:
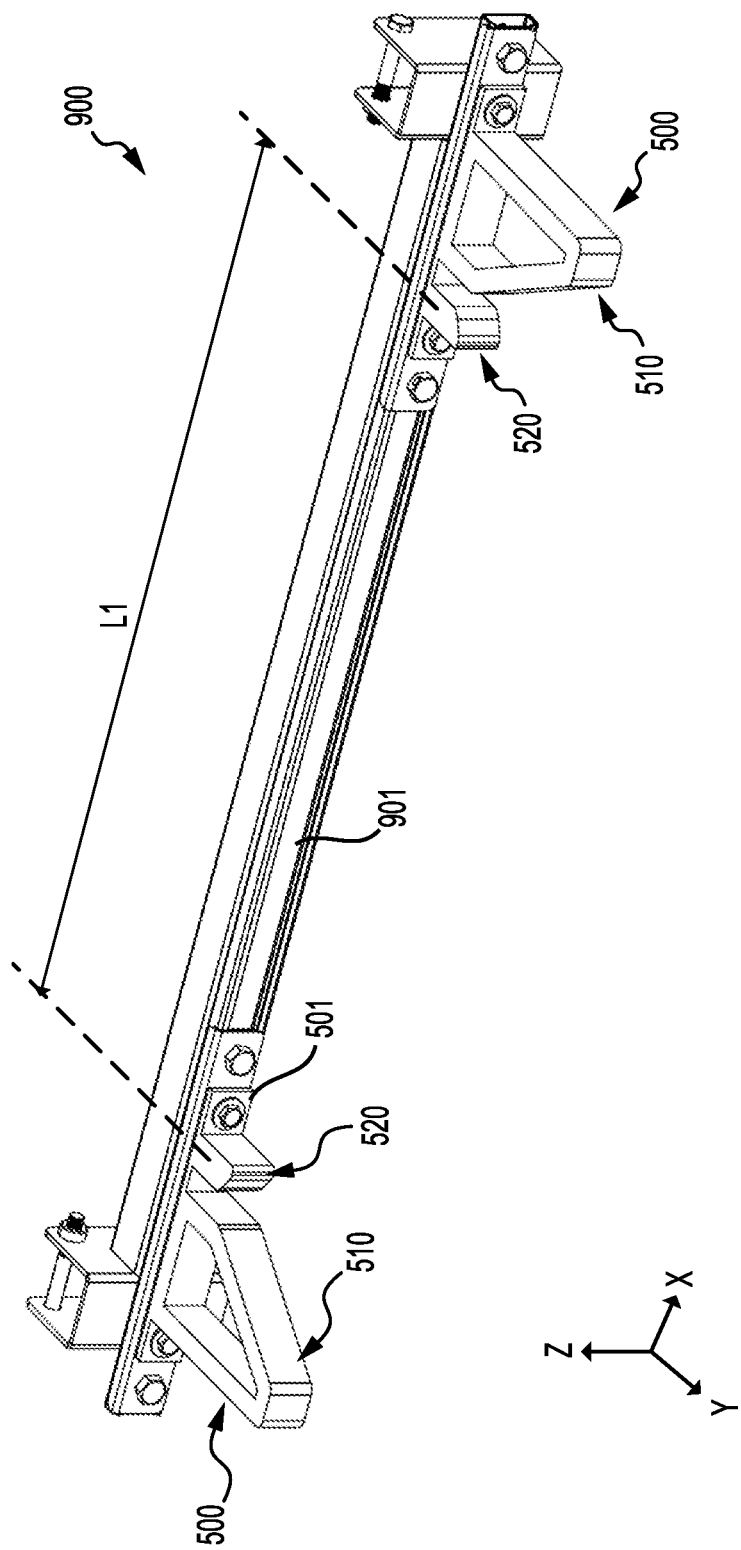
FIG. 9 illustrates a frame member coupled with the tote collapser brackets of FIG. 7.

FIG. 9 illustrates a frame member 900 coupled with two tote collapser brackets 500. The tote collapser brackets 500 can be spaced from each other. For example, a distance between two bumpers 520 of the respective collapser brackets 500 can be L1 (e.g., see FIG. 4). The frame member can be fixed to a wall or a support surface. Accordingly, different collapser systems can be configured. For example, two frame 900 can be mounted on a mounting frame and linearly actuated (e.g., as shown in FIGS. 1 and 13). In another example, a frame 900 can be fixed to a table to collapse a back side of a tote (e.g., 100) using the collapser brackets 500 and to implement manual collapsing at a front side of the tote (e.g., 100).

Figure 12:
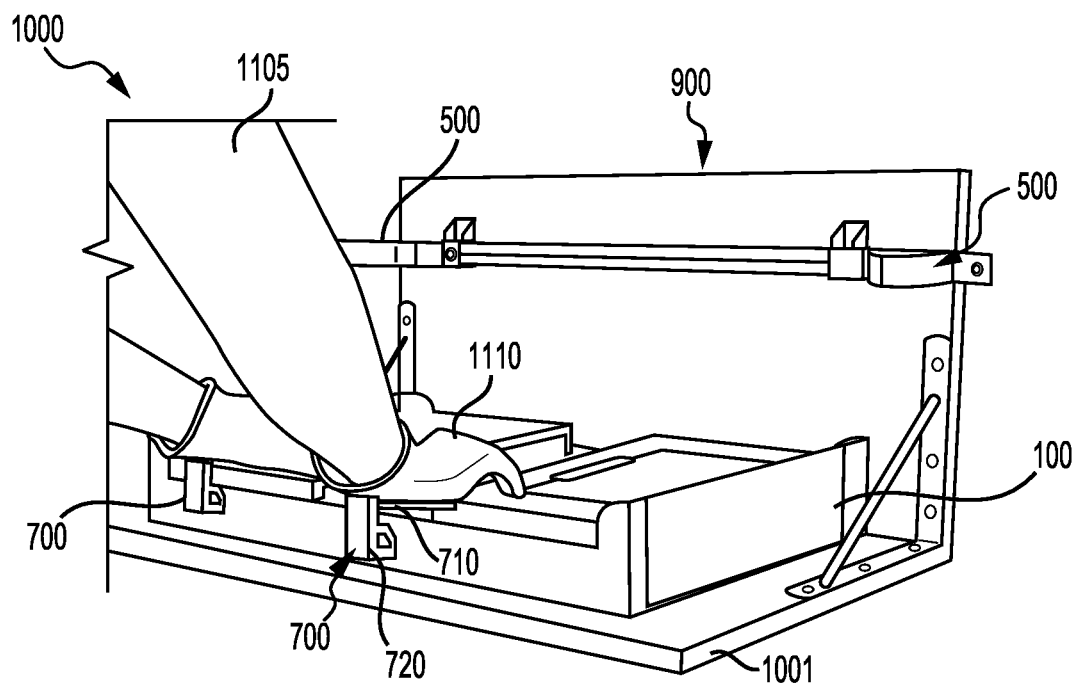
FIG. 12 illustrates a collapsed tote with the manually operated tote collapser system of FIG. 10.

FIGS. 10-12 illustrate a manually operated tote collapser system with the frame member 900 coupled to a table frame of a table 1000 or a wall. As shown in FIG. 10, the table 1000 can include a receiving platform 1001 on which the tote 100 can be placed and pushed against the frame 900 to collapse the tote 100. Referring to FIG. 11, a tote 100 can be received on the receiving platform 1001. An operator 1105 may align and push the tote 100 against the frame 900 so that the collapser brackets 500 can unlatch the back sidewalls of the tote 100. Additionally, the operator 1105 may wear hand gloves 1110 with another set of collapser brackets 700 attached to the hand gloves 1110.

The glove mountable collapser bracket 700 can be substantially similar to the collapser bracket 500 in structure and function. For example, the glove mountable collapser bracket 700 can include an indexer 710, a bumper 720 and a receiving space 730. The indexer 710 can be a straight projection 711 without an inclined surface. The bumper 720 can include a contoured surface 721 and a flat surface 722. The operator 1105 can position the hand gloves 1110 such that the respective glove mountable collapser brackets 700 can be aligned with latches on the front sidewalls of the tote 100. The operator 1105 can place the indexer 710 against the left and right sidewalls, as shown in FIG. 11. The bumper 720 gets aligned with the latches (e.g., 110 in FIG. 4). The operator 1105 can then push the hand gloves 1110 further causing the sidewalls to unlatch.

Once the sidewalls are unlatched, the front and back sidewalls 102 and 104 collapse on top of each other, as shown in FIG. 12. Further, the operator 1105 can fold down the left and right sidewalls on the other sidewalls. This way, the tote 100 can be transitioned to a collapsed state. In the collapsed state, the tote 100 is flattened, resulting in a compact and cubic shape. Several such collapsed totes 100 can be easily stacked and transported.

In some embodiments, the collapser brackets 700 may be optional or omitted from the gloves. For example, the operator 1105 can manually push, e.g., using fingers or other parts of their hands, the latch 110 on the tote 100 to unlatch one side (e.g., 102) of the tote 100, while the other side (e.g., 104) of the tote 100 may be collapsed via the collapser brackets 500 on the frame 900, as shown in FIG. 10.

FIG. 13 illustrates a tote collapser with manually operated linear actuator. The tote collapser can include a mounting frame 1300 and a linear actuator 1310 mounted on top of the mounting frame 1300. The mounting frame 1300 can include frame members 1301, 1302 with a set of collapser brackets 500. The frame members 1301, 1302 can be examples of the frame 900 (see FIG. 9). The frame members 1301, 1302 can be coupled to the linear actuator 1310 to move the frame members 1301, 1302. The linear actuator 1310 can include a gear 1311, a shaft 1312, and a lever 1313. As an example, the gear 1311 can be a rack and pinion. The lever 1313 can be coupled to the shaft 1312. An operator can manually rotate the lever 1313 along a direction R1 to rotate the pinion of the gear 1311 causing the rack to linearly move the frame members 1301, 1302 to move towards or away from each other. As the frame members 1301, 1302 move towards each other, the collapser brackets 500 unlatch the sidewalls of the tote 100, e.g., as discussed with respect to FIGS. 2-6.

In the illustrated embodiments, a collapser bracket (e.g., 300, 500, 600, and 700) includes an indexer, a bumper, and a receiving space integrally formed on a base. However, in some embodiments, the indexer and the bumper may be separately formed. For example, as illustrated in FIG. 13, indexers 1320 can be attached to an indexer frame 1321. The indexers 1320 can be structured similar to the other indexers discussed herein. For example, the indexers 1320 can include an inclined surface and spaced from each other to allow left-right centering of a tote when engaged. The indexer frame 1321 may be movable e.g., via an actuator 1350 relative to the tote 100. The actuator 1350 can be a linear actuator, a lead screw, or other suitable actuator.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. A tote collapser system for collapsing sidewalls of a tote, comprising:
    a mounting frame comprising a first frame member and a second frame member movable relative to each other;
    an indexer comprising an indexer projection shaped to align the tote in a specified orientation;
    a set of collapser brackets coupled to the mounting frame, the set of collapser brackets comprising a first collapser bracket, a second collapser bracket, a third collapser bracket, and a fourth collapser bracket, the first and the second collapser brackets attached to the first frame member and spaced from each other, the third and the fourth collapser brackets attached to the second frame member and spaced from each other, each collapser bracket of the set of collapser brackets comprising:
        a bumper comprising a bumper projection shaped to engage with a latch on a sidewall of the tote; and
        a retainer comprising a retainer projection extending perpendicularly from the indexer and configured to engage with top side of the sidewalls; and
    a linear actuator configured to move the first frame member relative to the second frame member, wherein when the linear actuator is actuated the first frame member moves towards the second frame member to cause the set of collapser brackets to undergo motion toward the tote, wherein in response to the motion, the bumper engages with the latch and unlatches the latch on the sidewall of the tote to facilitate collapse of the sidewalls of the tote, and wherein the retainer keeps the sidewall from moving upward.

2. The tote collapser system of claim 1, wherein the indexer is formed as a part of each collapser bracket of the set of collapser brackets, wherein each collapser bracket comprises a receiving space between the bumper and the indexer to receive a thickness portion of the sidewall of the tote, wherein the indexer has an inclined surface angled away from the receiving space and the bumper, and wherein in response to the motion, the indexer aligns the tote relative to the mounting frame and guides the thickness portion of the sidewall of the tote toward receipt within the receiving space.

3. The tote collapser system of claim 2, wherein the bumper has a contoured surface configured to progressively push the latch of the tote to unlatch the sidewall of the tote, wherein the contoured surface bounds a portion of the receiving space and curves away from the receiving space.

4. The tote collapser system of claim 3, wherein the bumper comprises a flat surface extending from the contoured surface, the flat surface configured to engage with a face of the sidewall and collapse the sidewall.

5. The tote collapser system of claim 1, wherein the indexer has a length greater than the bumper.

6. A tote collapser, comprising:
    a mounting frame comprising a frame member having a first end and an opposite second end;
    a first collapser bracket attached to the first end of the frame member;
    a second collapser bracket attached to the second end of the frame member;
    wherein each of the first and the second collapser bracket comprises:
        an indexer shaped to position a tote in a specified orientation;
        a bumper shaped to engage with a latch on a sidewall of the tote; and
        a receiving space between the indexer and the bumper to receive a thickness portion of the sidewall of the tote.

7. The tote collapser of claim 6, wherein the indexer has an inclined surface angled away from the receiving space and the bumper.

8. The tote collapser of claim 6, wherein the bumper has a contoured surface configured to progressively push the latch of the tote and unlatch the sidewall, wherein the contoured surface bounds a portion of the receiving space and curves away from the receiving space.

9. The tote collapser of claim 8, wherein the bumper comprises a flat surface extending from the contoured surface, the flat surface configured to engage with a face of the sidewall and collapse the sidewall.

10. The tote collapser of claim 6, wherein the frame member is fixed to a wall or support surface.

11. The tote collapser of claim 6, further comprising: a second frame member movable with respect to the frame member.

12. The tote collapser of claim 11, wherein the frame member and the second frame member are coupled to a linear actuator configured to automatically move the frame member and the second frame member upon actuation.

13. The tote collapser of claim 11, wherein the frame member and the second frame member are coupled to lever configured to manually move the frame member and the second frame member.

14. The tote collapser of claim 6, further comprising a third collapser bracket attachable to a hand glove, the third collapser bracket comprising an indexer, a bumper, and a receiving space.

15. A method of collapsing sidewalls of a tote using a tote collapser, comprising:
    receiving a tote at a mounting frame of the tote collapser, the mounting frame comprising a first frame member and a second frame member relatively movable with respect to each other;
    actuating a linear actuator to move a first frame member relative to a second frame member of the mounting frame; and
    moving, via the linear actuator, a set of collapser brackets coupled to the first frame member and the second frame member of the mounting frame to cause the set of collapser brackets to engage with and unlatch latches on the sidewalls of the tote and collapse the sidewalls of the tote, wherein the set of collapser brackets comprises: a first collapser bracket, a second collapser bracket, a third collapser bracket, and a fourth collapser bracket, the first and the second collapser brackets attached to the first frame member and spaced from each other, the third and the fourth collapser brackets attached to the second frame member and spaced from each other, and wherein each collapser bracket of the set of collapser brackets comprises: an indexer; a bumper; and a receiving space between the indexer and the bumper.

16. The method of claim 15, wherein moving the set of collapser brackets comprises:

aligning, via the indexers in the set of collapser brackets, the tote in a specified orientation such that the first frame member is parallel to a first sidewall of the tote and the second frame member is parallel to a second sidewall of the tote, the second sidewall being opposite to the first sidewall.

17. The method of claim 16, wherein moving the set of collapser brackets comprises:

subsequent to the aligning, moving the set of collapser brackets to cause the bumper to engage with latches on the sidewalls of the tote; and collapsing, via the bumper, the sidewalls of the tote.

18. The method of claim 16, wherein the collapsing comprises:

receiving portions of the sidewalls of the tote within respective receiving spaces between the indexer and the bumper.

19. The method of claim 16, wherein the linear actuator is a hydraulic piston configured to actuate automatically.

20. The method of claim 16, wherein the linear actuator comprises a rack and pinion coupled to a lever to manually actuate the linear actuator.

* * * * *